United States Patent [19]

McCormick

[11] 4,032,026
[45] June 28, 1977

[54] BULK HAULING FREIGHT CAR UNLOADING APPARATUS AND METHOD OF OPERATION

[76] Inventor: Paul W. McCormick, 200 Lee Drive, Coraopolis, Pa. 15108

[22] Filed: Feb. 10, 1976

[21] Appl. No.: 656,987

Related U.S. Application Data

[63] Continuation of Ser. No. 387,804, Aug. 13, 1973, now Defensive Publication No. T922,002.

[52] U.S. Cl. .............................. 214/152; 214/62 R
[51] Int. Cl.² ........................................ B65G 67/34
[58] Field of Search ............. 214/62 R, 58, 64, 152

[56] References Cited

UNITED STATES PATENTS 1,612,636 12/1926 Haubner ......................... 214/62 R
2,763,382 9/1956 Bell ................................. 214/62 R

*Primary Examiner*—Albert J. Makay
*Attorney, Agent, or Firm*—Z. L. Dermer

[57] ABSTRACT

An apparatus for unloading bulk cargo from a train of freight cars of the gondola or hopper type is provided. The unloading apparatus comprises a helical loop of track having a horizontal axis and with a loop extending vertically and positioned such that a train of a large number of open top hopper cars is pushed through the loop in a manner wherein the open tops of the cars always faces the center of the loop while the cars are passing through the loop. A second, inner loop of guide devices is provided to engage the cars adjacent the open end thereof in order to support the cars while they are inverted or partially inverted as they pass through the loop. A load retention device is provided along a portion of the loop to retain the cargo in the cars as the cars are being partially inverted by passing through the loop to prevent premature dumping of the cargo.

In certain embodiments, means are provided for adjusting the distance between the inner and outer loops to accommodate different car sizes.

3 Claims, 9 Drawing Figures

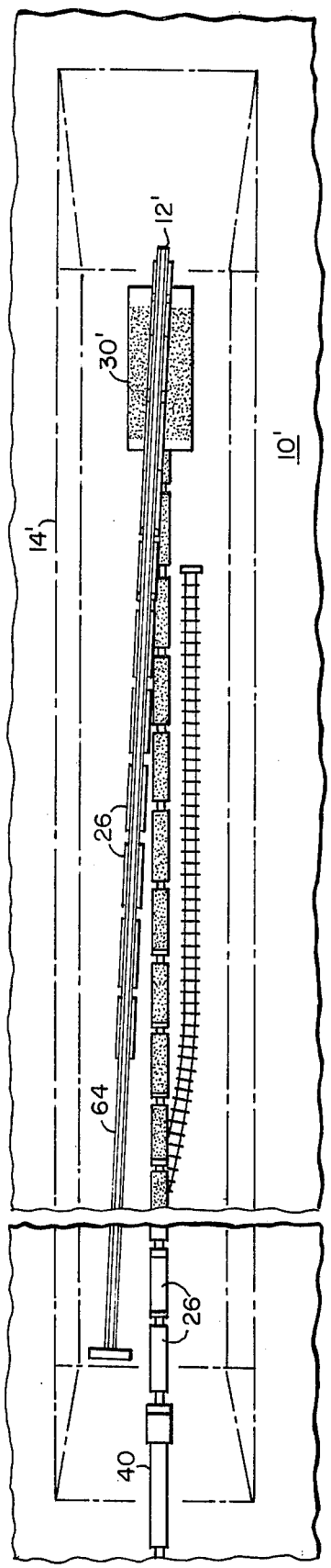
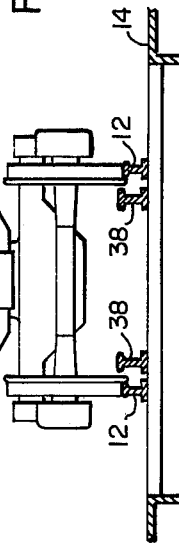
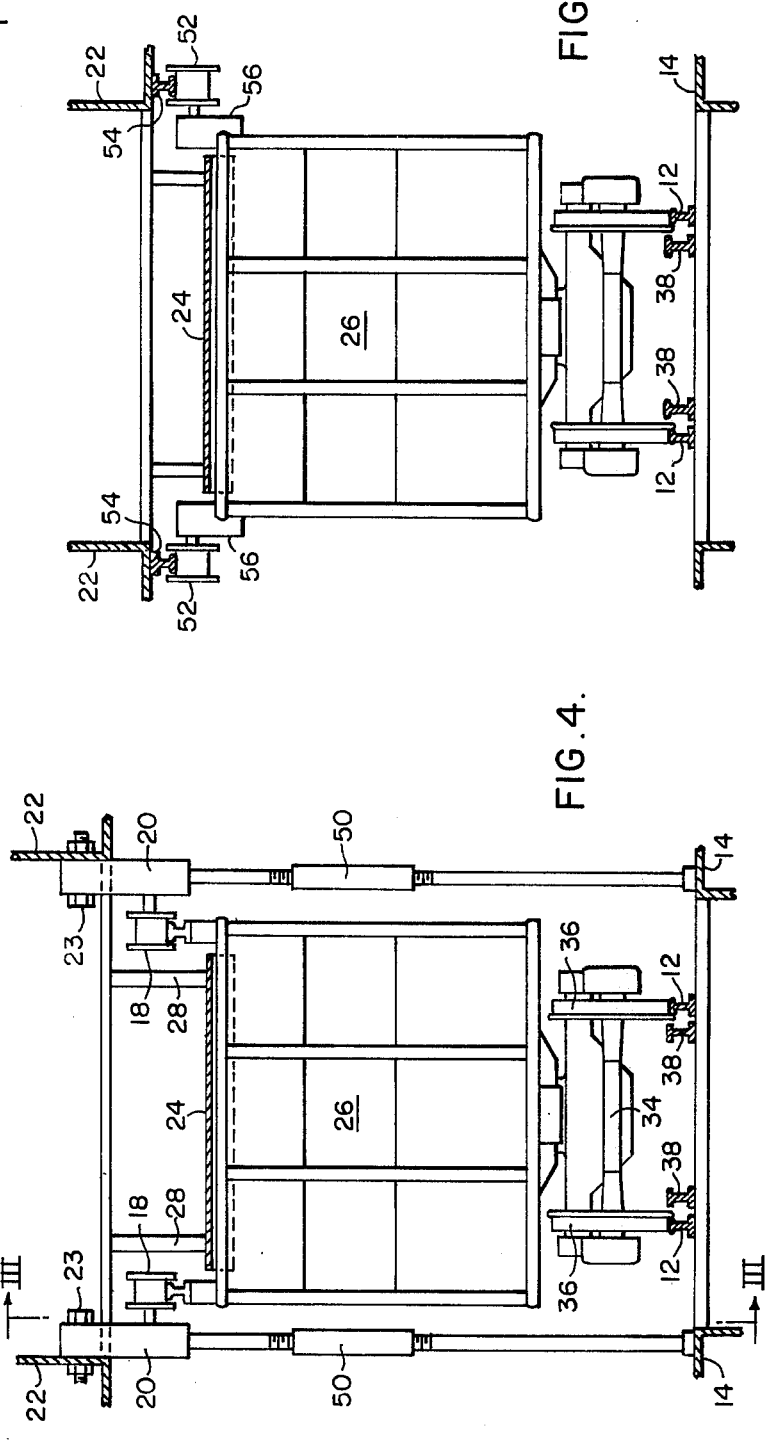

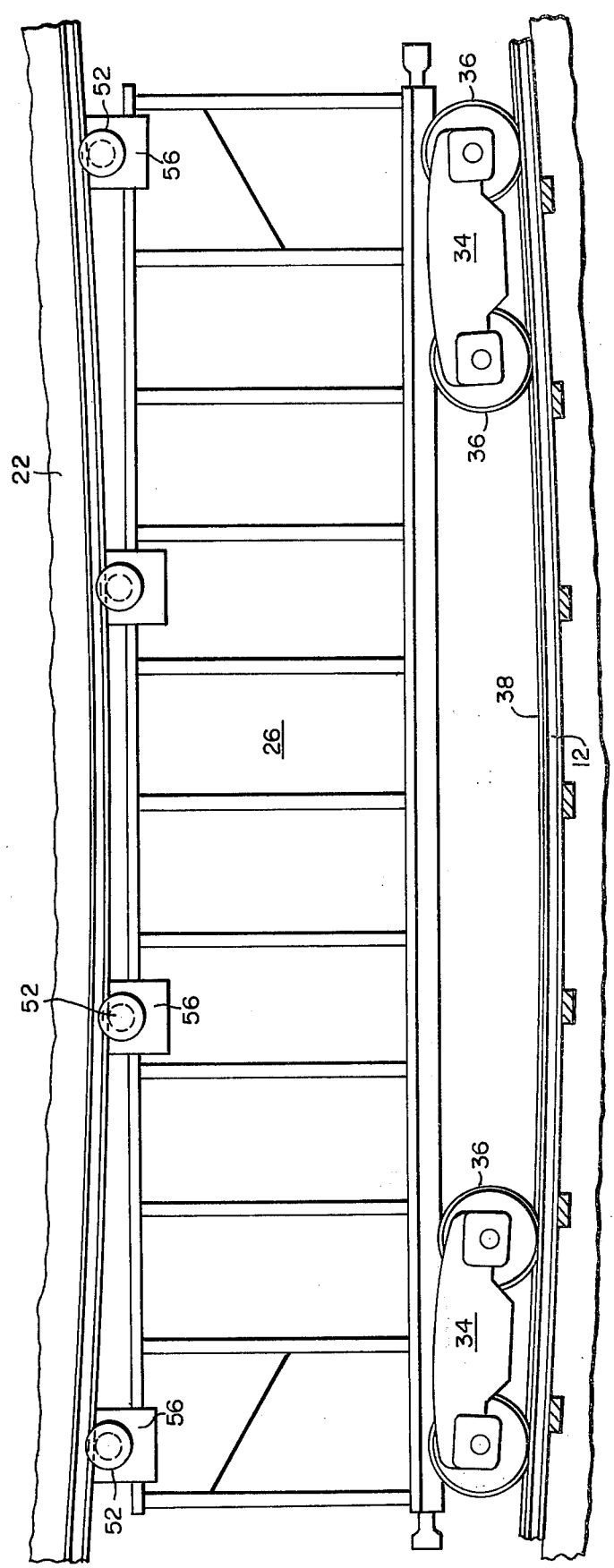

BULK HAULING FREIGHT CAR UNLOADING APPARATUS AND METHOD OF OPERATION

This is a continuation of application Ser. No. 387,804 filed Aug. 13, 1973, New defensive Publication T922,002.

BACKGROUND OF THE INVENTION

1. Field of the Invention

This invention pertains to mineral freight trains employing gondola or hopper type freight cars and to apparatus and methods for unloading the cargo of the train in a efficient manner.

2. Description of the Prior Art

In the present era, where railroads are exposed more and more to financial difficulty, it becomes more and more important for efficient and relatively inexpensive techniques to unload bulk materials from trains of hopper or gondola cars. More particularly it has been determined by railroads that the use of unit trains for the hauling of bulk material, such as minerals, a prominent example of which are coal trains for supplying coal as fuel for electrical power plants, are necessary in order to reduce the transportation cost of such materials and to make coal a valuable competitive fuel when contrasted with other fuels. Large trains of one hundred or more hopper cars are filled at a mine and move directly as a unit to an electrical power station or to a central dumping point for a number of power stations where the contents of such trains are dumped. The trains then return to the mine for reloading.

For certain materials which flow readily when shipped in bulk, such as grain, the hopper cars may be provided with movable bottom platforms such that the bulk material flows from the car through the bottom thereof. Where coal is involved, it will be noted that the same frequently is exposed to water during the mining, processing or transportation thereof and when the water freezes, the coal normally solidifies so that it does not flow, but must be removed from the cars as one or more large bulky pieces. Present devices actually employed for dumping unit trains comprise power rotating devices for the cars which require each car to be separately decoupled from the train, rotated 180° so that its contents is dumped, returning the car to the normal upstanding position and recoupled to the train. This is obviously a time consuming procedure involving manual operations which increases substantially the transportation cost of the material. Other systems which form a part of the prior art, but which have not, to the knowledge of the applicant, been used or tried, include loop systems of the type illustrated in U.S. Pat. No. 216,736 to Ramseur (1906), Stillwell et al. U.S. Pat. No. 2,540,766 (1951), Stehli U.S. Pat. No. 1,027,084 (1912) and Haubner U.S. Pat. No. 1,612,316 (1926). Each of these patents is directed to the passing of a number of cars or containers through a loop, however in each event, the open end of the car does not face the center or axis of the loop but faces the opposite direction. These arrangements are not feasible with todays hopper or gondola car constructions inasmuch as the wheel carriages of present gondola cars are secured to the main open section of the cars such that if the car is inverted while the weight of the car is supported solely by the carriage, the cars will separate from the carriage. In order to pass a car through a loop with the open end of the car facing outwardly of the loop and with the weight of the car being supported when the car is inverted by the wheels, it will be necessary to modify substantially todays presently available cars in order to improve the connection between the carriages and the bodies of the cars. This problem may also be seen in the system of O'Toole U.S. Pat. No. 1,491,060 (1924). Other train and unloading arrangements forming upon the prior art include Bell U.S. Pat. No. 2,763,382 (1956) which is directed to a continuous car dumping arrangement but which requires in addition to special track arrangements, special flat car clamping devices which receive the gondola cars and clamp the same in position while passing them through a side inversion in order to move their contents. The Pardee U.S. Pat. No. 2,121,365 (1938) provides for a side ways rotation of the cars to move their contents and provides for guide means formed on the side of the cars to support the weight of the car and prevent the separation of the car from the wheel carriage during the unloading operation. The provision of the side guide means and support means of Pardee requires a formation of a car dumping arrangement having substantially close tolerances to accommodate the guide means and further requires a substantial modification to each of the cars. More paticularly, in the event of a distortion of the shape of the car, which frequently occurs during normal car usage over a long time period, the car will become stuck while passing through the Pardee arrangement. Frequent shutdown of the Pardee dumping arrangement to remove "distorted" hopper cars will result.

Unloading arrangement for other commodities such as the removal of pears and cherries from a number of cartons or containers as illustrated in Turner U.S. Pat. No. 1,945,758 (1934) comprises a substantially different problem than the removal of the contents of a one hundred car train where each car weighs 65,000 pounds and contains a 200,000 pound load.

SUMMARY OF THE INVENTION

The aforementioned problems of the prior art are overcome in the present invention by providing a load removal apparatus and method for bulk cargo in trains of hopper or gondola cars which provide adequate support of the cars during the dumping operation and which require small, if any, modifications to the cars themselves. A helical loop of track extending about a horizontal axis with the loop of track extending 360° is coupled to track lying along a grade so that when cars are pushed along the track, the cars pass upwardly through the loop and pass through the loop with the open ends of the cars facing the center or axis of loop. In this manner, as the cars become inverted, their contents will pass therefrom through the action of gravity and the cars of the train remain completely coupled through the unloading operation. A second or inner loop of guide and support means are provided to engage the side edges of the cars adjacent the open ends thereof to support the same as the weight of the cars is transferred from the wheels to the latter edges while the cars are becoming inverted. Antifrictional means such as rollers are provided on the guide-support means to enhance the passage of the cars through the loop. A fixed cover or lid desirably is formed on a portion of the loop to prevent premature spilling of the cargo as the cars are becoming inverted. If desired, means may be provided at a predetermined portion of the loop to assist in the unloading of the cargo from the cars should the same become lumped due to adverse weather conditions such as freezing temperatures. The track bed may be graded such that the train is moving downwardly under the force of gravity to assist in providing the energy necessary to push the train entirely through the loop. It is contemplated that the train will be pushed through the loop and the cars emptied through the use of locomotive power alone without any additional pulley or hoist means on the unloading apparatus. Means are provided on the track loop to engage the carriage wheels throughout all portions of the loop in order to insure alignment of the wheels with the track when the weight of the cars is returned to the wheels after passing through the upper end of the loop. Additionally, means are provided for adjusting the relative distances between the outer loop of track and the inner guide-support means in order to accommodate trains of cars of different heights.

BRIEF DESCRIPTION OF THE DRAWINGS

FIG. 4 is an end view of a car and loop arrangement illustration of the means of FIG. 3 for supporting the cars passing through the loop and taken along the lines IV—IV of FIG. 1;

FIG. 5 is an end view of a car and loop arrangement illustrating another embodiment for supporting the cars passing through the loop;

FIG. 6 is a view in side elevation of the car and loop arrangement and supporting means of FIG. 5;

FIG. 7 is a fragmentary view of still another support arrangement for supporting the cars passing through the loop;

FIG. 9 is a top plan view of the arrangement of FIG. 8.

DESCRIPTION OF THE PREFERRED EMBODIMENTS

Figure 1:
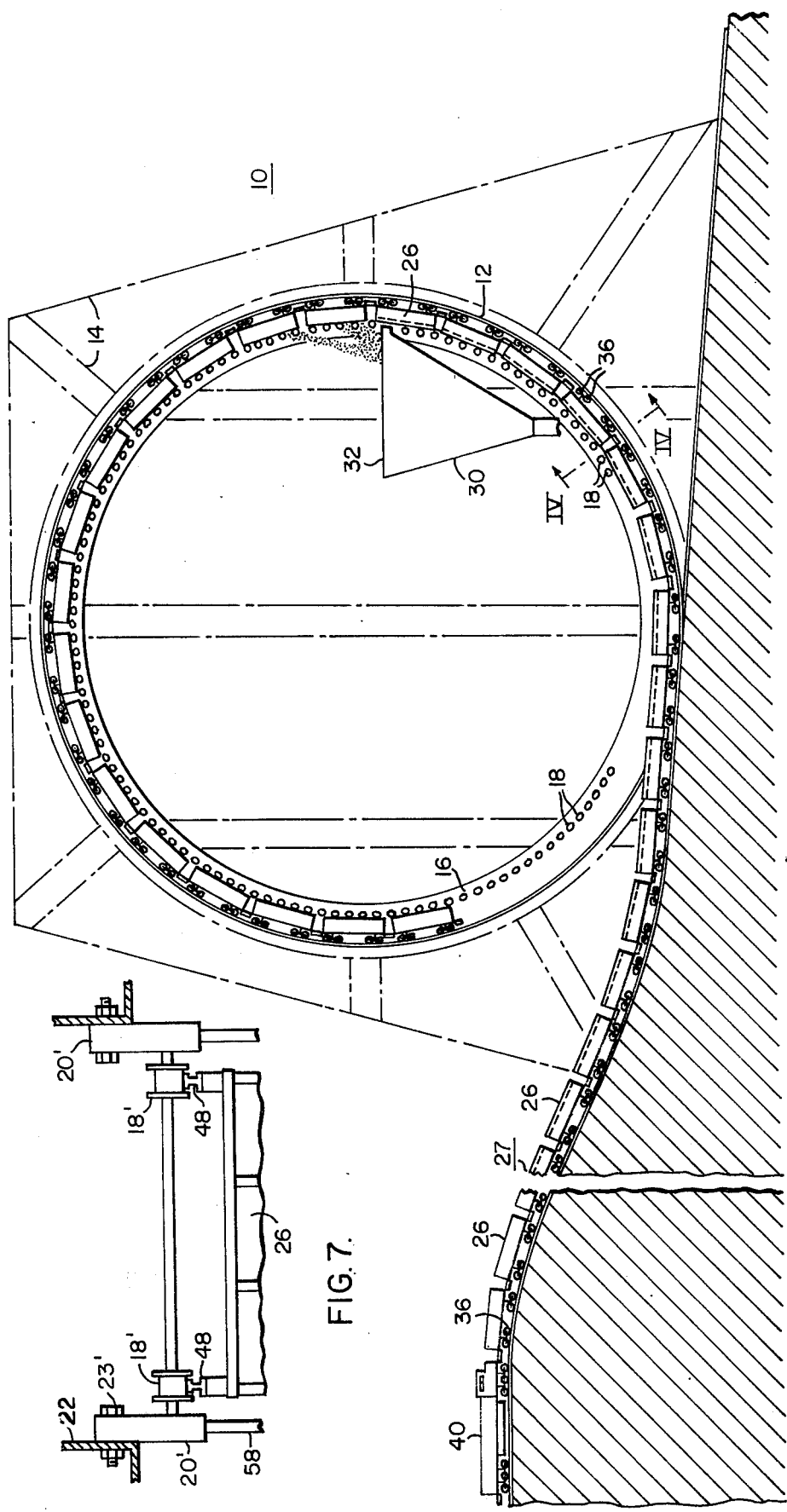
FIG. 1 is a schematic view in side elevation of a bulk hauling freight car dumping apparatus in accordance with the principles of my invention.
Figure 2:
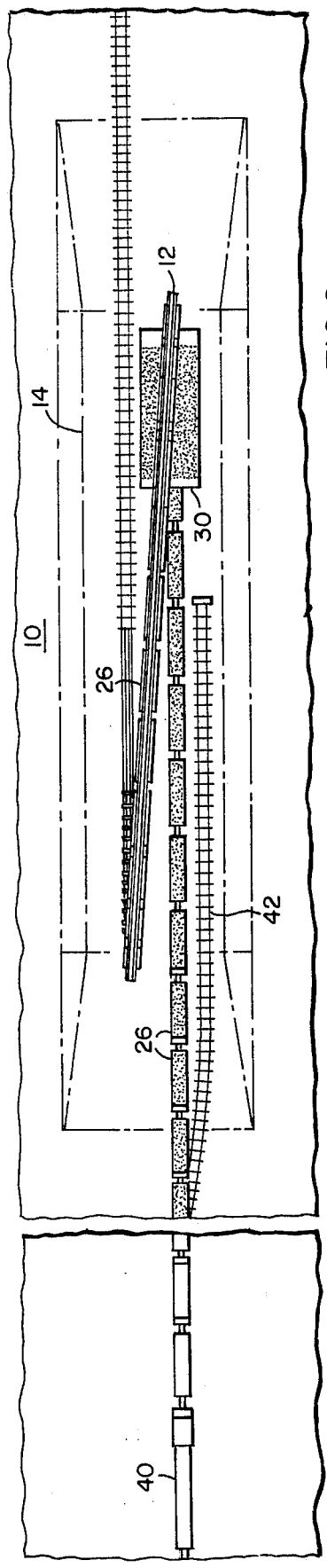
FIG. 2 is a top plan view of the train dumping apparatus of FIG. 1.
Figure 3:
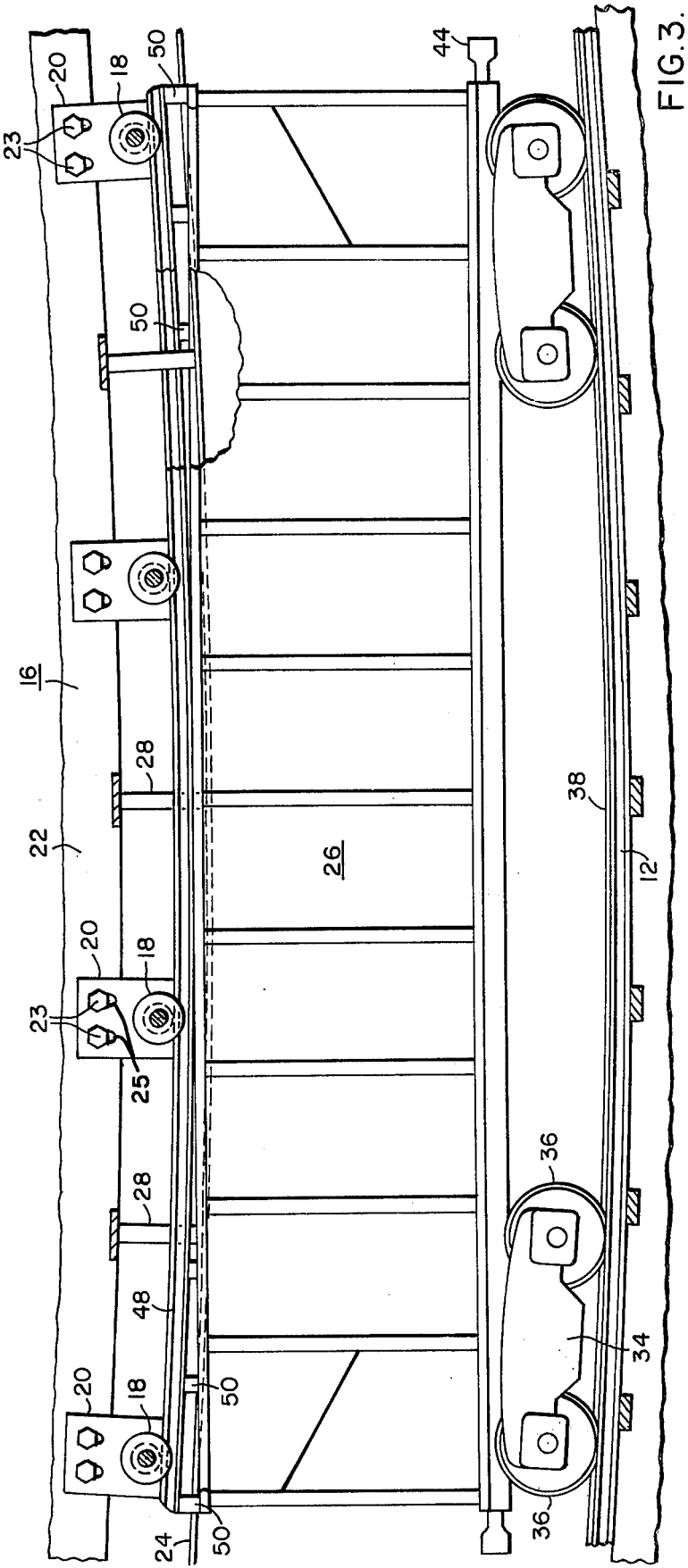
FIG. 3 is a view in side elevation illustrating helical track loop and car arrangement and including one means for supporting the cars passing through the loop, and with the car positioned in the first quadrant of the helical loop and taken along the lines III—III of FIG. 4.

Referring to the embodiments of this invention illustrated in FIGS. 1 through 4, there is illustrated a car unloading arrangement identified by the general reference numeral 10 which or including a generally helical outer loop of track 12 extending in the vertical direction in the helical manner such that the loop of track extends partially axially relative to the axis of loop 12 as it forms the loop, as illustrated in FIG. 2. The axial extension of the loop 12 is necessary to accommodate the dumping of the coal and of course, to prevent interengagement of the front end of the train after it has completed the loop with the remainder of the train just entering the loop. The entire car and loading arrangement including the loop 12 is supported by a superstructure illustrated schematically in FIG. 1 and identified generally by the reference character 14. Superstructure 14 is designed to support the car unloading arrangement including the loop 12 as well as the remaining components thereof and is of a bridge type configuration sufficient to support the loads created on loop 12 and will not be further described in detail. A suitable superstructure arrangement for a specific car unloading structure may be designed by one of ordinary skill in the art and does not per se form a part of the instant invention. An inner loop identified generally by the reference character 16 is formed inwardly of the outer loop and co-extends with substantially the entire outer loop 12 except for the portions of the loop 12 where the cars are substantially vertical. As illustrated in FIG. 1, the inner loop 16 extends approximately 300° of the 360° outer loop 12. The inner loop 16 is also supported in a suitable manner by the superstructure 14. Referring to FIG. 3, it will be seen that the inner loop 16 includes a plurality of rollers 18 which are rotatably mounted by suitable means on a plurality of support plates 20 which are in this embodiment secured to a loop shaped superstructure segment 22. Adjacent the first quadrant of the outer loop 12, there is provided a fixed lid structure 24 illustrated more clearly in FIG. 3 which is positioned to be located adjacent the open ends of hopper cars 26 as they pass through the first quadrant of the loop 12. The lid structure 24 is supportedly mounted on the superstructure portion 22 by suitable means such as by support beams 28 which position the lid 24 to cover substantially the open end of the car 26 to prevent premature emptying of the cargo of car 26 in the first quadrant of loop 12. As will be seen in FIG. 1, a bin or cargo receiving funnel 30 is formed with an open end facing upwardly and terminating in this example just below the end of the first quadrant of the outer loop 12 for receiving the cargo of the cars 26. The gondola or hopper car 26 is provided with a pair of spaced carriages 34 having conventional steel train wheels 36 thereon. As will be seen more clearly in FIG. 4, the outer loop 12 desirably is provided with a pair of inner guide rails 38 which are positioned inwardly of the track of the outer loop 12 and extend toward the carriage 34 of each car 26 to a greater extent than the track rails, in order to insure that the steel wheels 36 of the carriage are maintained in position, particularly when the car is passing through the loop 12.

This invention contemplates that the outer loop 12 is provided with rails extending entirely around the periphery of the unloading apparatus 10 in order to enhance the rigidity of the unloading structure 10 and further, it is contemplated that the outer loop 12 includes guide rails 38 extending about the entire periphery of the outer loop 12 in order to maintain the wheels 36 of the car carriages 34 in position at all times and further to impart rigidity to the unloading structure 10.

Referring now to FIG. 1, it will be seen that a large train of gondola cars 26 is to be passed entirely through the unloading apparatus 10 in a manner such that the open ends of the gondola car 26 face the center or axis of the loop 12. The cars enter the loop and start moving upwardly through the first quandrant of the loop with the weight of each car as it enters the loop being entirely upon the car wheels 36. As the car enters the loop, the side edges of the car adjacent the top open end thereof are engaged by support guide or roller means 18 and the open ends of the cars are juxtaposed to a suitable lid device such as a fixed curved plate 24 which is positioned to prevent premature unloading of the cargo and is positioned between the side walls of the cars. As the cars pass upwardly through the loop, the cars are engaged on opposed ends by the rails of the outer loop 12 engaging car wheels 36 and by the guide-support means 18 engaging the upper edges of the car. As the car continues to pass upwardly, some of the load of the car is being transferred from the wheels 36 to the upper edges of the car and correspondingly to guide-support means 18. When each of the cars 26 reaches that position in the loop adjacent the upper edge 32 of hopper 30, the lid or cargo retaining means 24 terminates thereby permitting the contents of the car 26 to pass into the hopper 30. As the cars continue to pass upwardly through the loop, all of the weight of the car is transferred to the support-guide rollers 18 until the car reaches the final quadrant of the loop where the weight of the car is again returned to the wheels 36 and the track of outer loop 12. In this embodiment it is contemplated that each car will pass entirely through the outer loop 12 dumping its contents into the hopper 30. In order to reduce the amount of load in the cars as soon as practical a scoop or plow (not shown) of conventional construction may be positioned, in a pivotal way, up the track from the first quadrant of the loop and in certain examples while the cars are on the downgrade portion of the track, is adjacent location 27 in FIG. 1. The purpose of the scoop is to unload one-fourth to one-half of the lading prior to the cars entering the loop. This reduction of load would significantly improve, or lighten, the stress present at the bottom of the loop and reduce the engine power necessary to pass the train through the loop.

Present dumping procedures usually include provisions for heating the car sides and bottoms to thaw enough of the frozen material so that it will fall away. It is comtemplated that this heating apparatus could also be used here, e.g. infrared radiation devices. It will be appreciated that the plow device will be normally usable with frozen material, irrespective of the use of a supplementary heating device for frozen material since the firm or "lumped" material is normally located in the bottom part of the load.

It is contemplated that the cars will each be pushed through the unloading apparatus 10 by a suitable means such as a diesel or electric locomotive 40 and to assist in providing the energy necessary to push the cars through the loop, the track leading to the entrance of the loop 12 desirably is formed with a substantial downgrade, preferably equal to a height approximating one-half of the diameter of the loop 12 to provide a gravitational assist in the pushing of the cars upwardly through the loop. When the cars have passed through more than 180° of the loop, the emptied cars will also be providing a pulling force on the train in order to further assist in the passage of the cars through the loop. If desired, guide-support means 18 can be provided with a brake device similar to the train air brake system for giving more control and safety to the train movement.

In accordance with this invention, it is contemplated that the locomotive 40 will not pass through the loop; rather, it will stop at a point before entering the loop. In order to empty the last cars loaded cars in the loop, it is contemplated that a plurality of empties would be coupled to the locomotive in a suitable railroading manner such that the locomotive pushes all of the filled cars through the loop for emptying. In order to accommodate the latter procedures, a side rail 42 is provided adjacent the car unloading apparatus 10 to retain a number of empty cars for passage through the loop. The empties located on the side rail 42 may be coupled to the locomotive after the filled cars have passed the junction of the side rails of the main track and may then be passed through the unloading apparatus 10. After the last of the filled cars has been unloaded, the locomotive 40 is preferably diverted by suitable track (not shown) to the other side of the loop where it is hitched to the other end of the train in order to pull the remaining emptied cars through the loop and return the train to service. It is also contemplated by this invention that rather than using a single engine, it may be desirable to connect a second engine to the front of the train after a number of cars have passed completely through the loop to cooperate with the rear engine to move the train through the unloading apparatus.

It is further contemplated that another practical and efficient method of operating this facility would be to usually leave the loop filled with cars. This contemplates the coupling of a newly arrived loaded train to the cars standing in the loop. After the new loaded train is so coupled, the front and rear locomotives (if two are used) move a predetermined number of cars through the loop to unload the latter. Thereafter, the front locomotive can "cut" a desired number of cars away from the train and depart with an empty train of predetermined size.

It will be appreciated that the limiting factor of the diameter of the loop will be the extent to which conventional car coupling such as that illustrated at 44 in FIG. 3 can be subjected to a vertical movement without decoupling. As contemplated that conventional gondola cars are of a length of 40 to 44 feet and that the loop radius is normally greater than 276 feet in order to permit the use of present day car couplings wthout modification.

As illustrated in FIG. 3, it is contemplated that the weight of the car will be transferred to the side walls of the car adjacent the open end thereof while the car is passing through the at least the second and third quadrants of the loop. In the event there is concern with the load bearing ability of the car edges itself or of distortion of the shape of the side edges of the car due to normal wear and tear, each of the cars may be modified by adding a suitable steel structure identified by the reference character 48 to the side edges of the car 26. If desired, the structure 48 may comprise a segment of steel rail which is suitably secured to the car 26 and if further desired to enhance rotation of the car through the loop while in engagement with the guide means 18, the rail may be complementarily curved of the same curvature as the circle created by the guide means 18. In the event the support means 48 is so curved, spacer means 50 of different lengths may be employed to secure the support means 48 to the car 26. Referring to FIG. 3, it will be seen that the guide means 18 are secured to superstructure in this example by plates 20 which are illustrated as bolted to the superstructure section 22 by bolts 23. Slots 25 are provided in the plates 20 in order to adjust the dimension between the guide means 18 and the outer loop 12 in order to permit the car unloading apparatus in this example to accommodate gondola cars 26 of different heights. It is contemplated however that a given train will include gondola cars of the same height so that interim adjustment of the position of rollers 18 will not occur during the unloading of a given train. The adjustment means of FIG. 3 may be further enhanced by the provision of turnbuckles 50 extending between plates 20 and a portion of the superstructure 14 to accommodate the positioning of the guide means 18 relative to the track of the outer loop 12.

The embodiment of FIG. 5 is illustrative of a modification of the support-guide means illustrated in FIGS. 1 through 4 and like parts of FIGS. 5 and 6 will be designated by the same reference characters employed with FIGS. 1 through 4. In accordance with the embodiment of FIGS. 5 and 6, the car 26 is provided with a plurality of rollers 52 which are secured to the side walls of the car 26 adjacent the open end thereof and are positioned to engage rails 54 mounted on the superstructure portion 22. Thus the support-guide means of this embodiment constitutes the provision of rails 54 which engage wheels 52 forming a part of the gondola cars 26. The wheels 52 are preferably mounted on support plates 56 secured in a suitable manner to the upper side walls of the car 26 such that the wheels 52 are positioned outwardly of the edges of the car so as not to interfere with the unloading of the contents of the car as it passes through the unloading apparatus 10. In order to accommodate the curvature of the rails 54 forming the guide means, the wheels 52 desirably are formed at different heights so as to frictionally engage a rail of a predetermined radius and to distribute the load of the car 26 to each of the wheels 52.

A further modification of the guide means and car arrangement is illustrated in FIG. 7. In this embodiment, car 26 is provided with rails 48 mounted on the upper side edges of the car to impart greater strength to the car and the guide-roller means 18' of FIG. 7 are secured to the superstructure 22 by plate means 20' and suitable bolts 23'. Positioning means such as turnbuckles (not shown) are secured to the plates 20' with a portion 58 of the tie rod of such a turnbuckle being illustrated in FIG. 7. The main difference between the support-guide means of FIG. 7 with that of FIGS. 1 through 4 is a provision of a common shaft 60 for adjacent rollers 18' in FIG. 7. In the latter arrangement the shaft 60 provides greater rigidity in the superstructure 14 of the car unloading arrangement 10.

Figure 8:
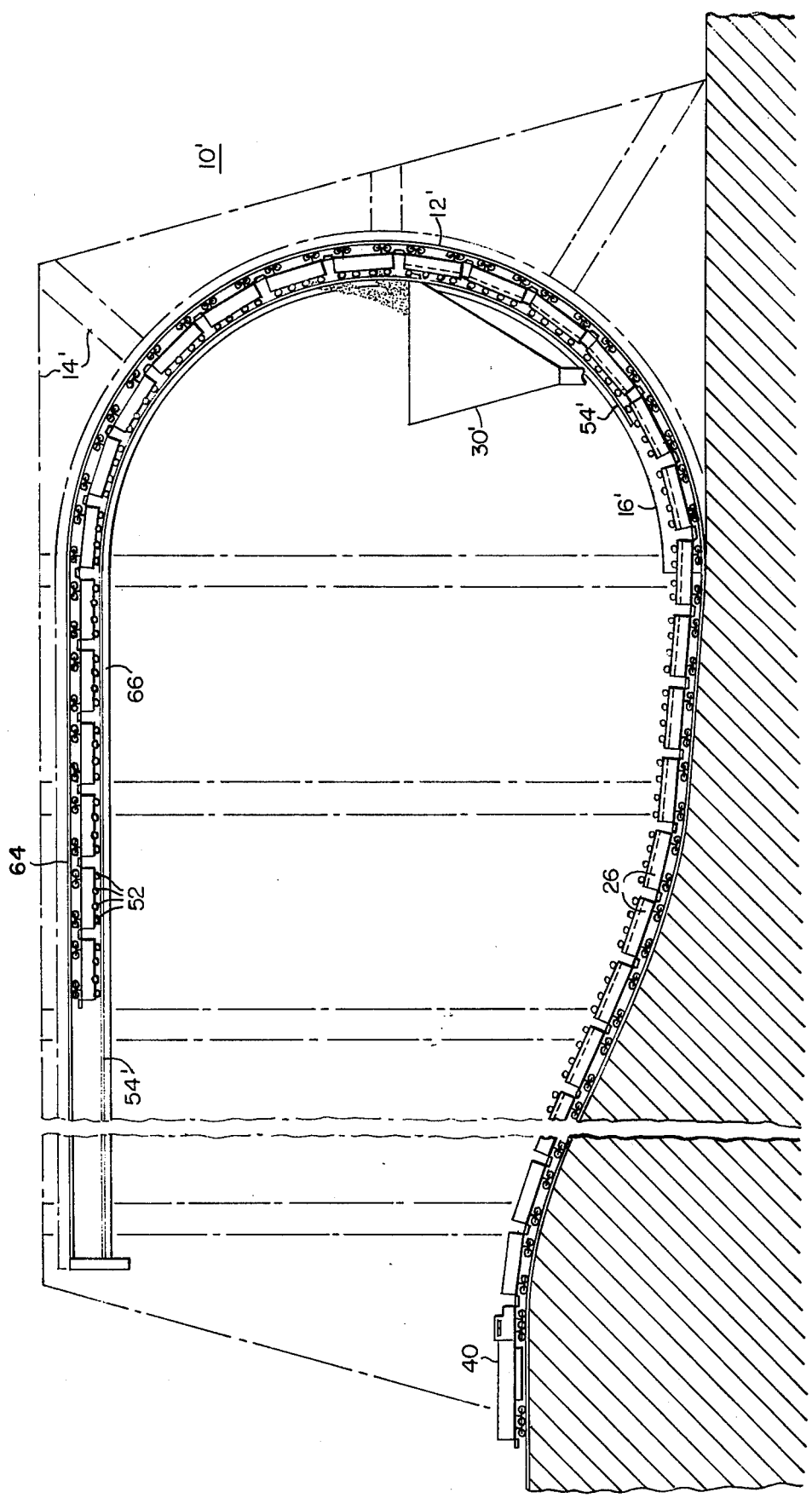
FIG. 8 is a schematic view in side elevation of another loop arrangement for dumping the contents of bulk hauling freight cars.

Referring to the embodiment of the invention of FIGS. 8 and 9, there is illustrated therein a car loading arrangement employing one-half of a loop rather than a full loop as illustrated in FIGS. 1 and 2. Accordingly, the car unloading arrangement 10' of FIG. 8 and 9 includes a superstructure 14' which supports an outer semi-loop 12'. The semi-loop 12' extends an arc for 180° in a vertical direction and the upper end of the 180° are of the loop 12' is then provided with a horizontal extension 64. An inner guide means-semi-loop 16' is formed with a horizontal extension 66' inwardly of the outer loop 12' and horizontal extension 64. The superstructure 14' supports the semi-loops ,12' and 16' and the horizontal extensions 64 and 66 thereof in a suitable manner known in the art.

It is contemplated in accordance with the embodiments of FIGS. 8 and 9 that the inner loop 16' and the horizontal extension 66 thereof comprises the guide-support arrangement of FIGS. 5 and 6 wherein each of the cars is provided with wheels 52 thereon and wherein the superstructure 14' includes a rail 54' both along the inner loop 16' and the horizontal extension 66. A cargo retention means such as lid 24' similar to lid 24 of FIGS. 1 through 4 desirably is provided in the first quadrant of the semi-loop and that a suitable hopper 30' be provided for receiving the cargo. Thus, the distinguishing feature between the embodiments of FIGS. 8 and 9 and that of FIGS. 1 through 4 comprises the use of a horizontal extension on the cargo unloading device 10' rather than a 360° loop. With this arrangement, locomotive 40 is provided to move each of the cars 26 into the unloading apparatus 10' by moving the cars into the outer semi-loop 12' where a portion of the load is transferred from the wheels 36 of the car 26 to the wheels 52 and rail 54' of the inner loop 16 as the cars move up around the semi-loop. As illustrated in the previous embodiment, the track leading to the unloading apparatus 10 preferably is provided with a downgrade in order to reduce the amount of engine power necessary for unloading the cars. The cars are pushed upwardly through the first quadrant of the semi-loop with the load of the cars being transferred gradually from the wheels and outer loop 12' to the wheels 52 and rail 54'. As the cars pass above the first quadrant, the load is dumped into the hopper 30' and if desired, assisting means (not shown) may be employed as previously described to assist in the removing of the load from the cars. As the cars pass through the second quadrant of the semi-loop, substantially the entire load is passed to wheel 52 and rail 54' and as the cars complete passage through the second quadrant, the cars continue to move along rail 54' in the horizontal inner loop extension 66. In this area however the load of the car is transferred to those wheels 52 located closely adjacent rail 54' and the other wheels. It is contemplated that the load will be transferred to outer wheels 52 of each car in this arrangement. The train is arranged so that a number of empties are positioned between the last of the fully loaded cars in the train and the locomotive 40 so that the entire train may be unloaded with the empties taking up the space between the locomotive 40 and the second quadrant of the semi-loop 10'. After the train has been unloaded, the engine is placed in reverse and the unloaded cars are pulled out of the unloading apparatus 10' by the engine and with the assistance of gravity created by the cars moving downwardly through the semi-loop.

It is clear that many modifications may be made in the train unloading structure of this invention without departing from the broad spirit and scope of this invention. It is specifically intended that the above embodiment be interpreted as illustrative of this invention and not in a limiting sense.

I claim:

1. The method of unloading a first train of open hopper cars containing bulk material without decoupling the cars comprising pushing the train of cars by a rear engine through a vertically extending helical, 360° loop of track such that the open ends of the cars face the center of the loop; retaining the contents in the car until the car passes through the first quadrant of the loop, connecting an engine to the front car of the train after the latter has passed entirely through the loop and continuing to move the train through the loop through the pushing and pulling forces respectively of the front and rear engines.

2. The method of claim 1 including the step of stopping the first train before the rear engine enters the loop, decoupling the rear engine from the train and moving it to a siding coupling a second train being moved by a rear engine to the rear of the first train and moving the remainder of said first train and said second train through the loop.

3. The method of claim 1 including passing said train along a downward incline immediately prior to said train entering said loop.

* * * * *